Patented Dec. 7, 1937

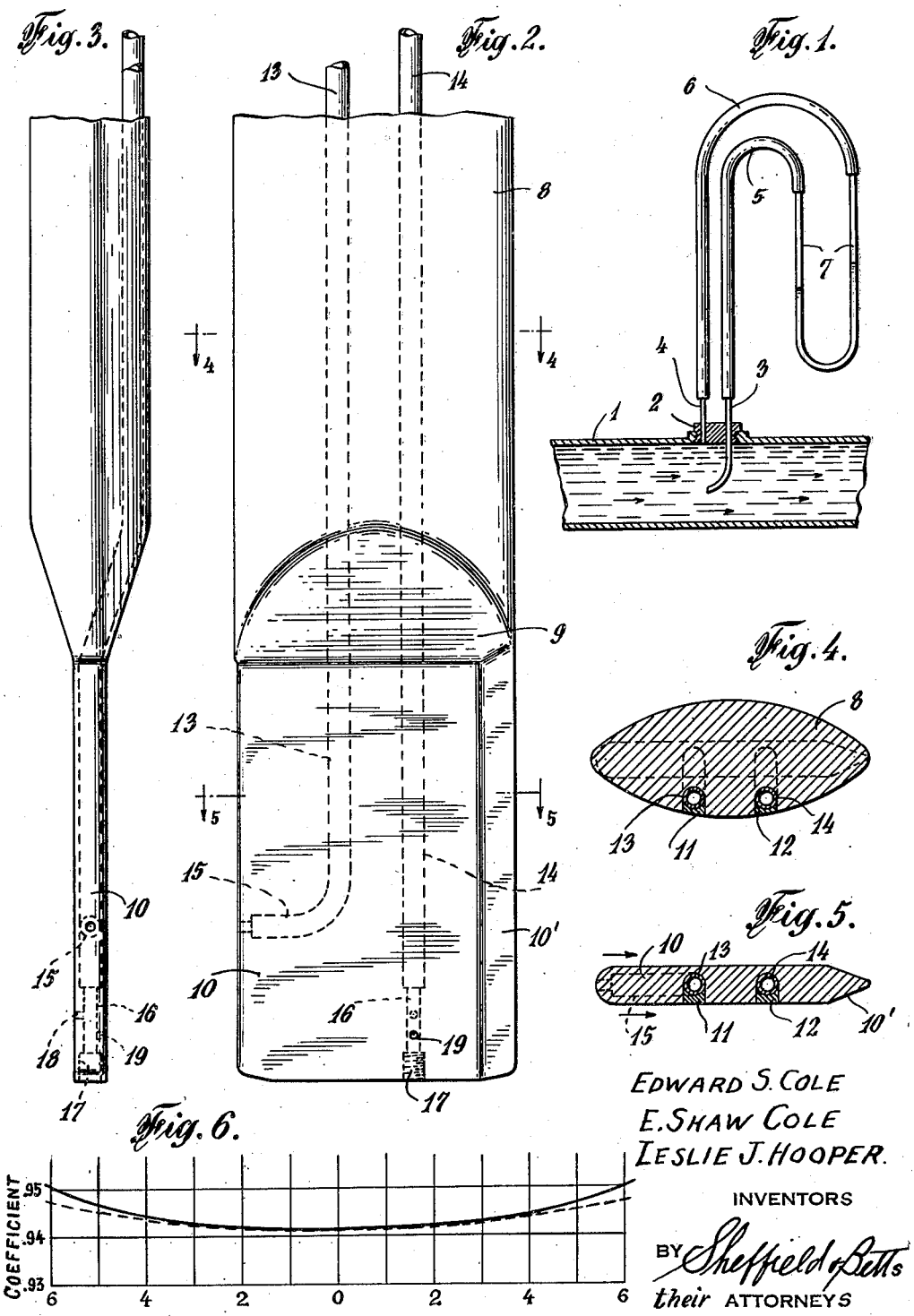

2,101,165

UNITED STATES PATENT OFFICE 2,101,165

PITOT TUBE

Edward S. Cole and Edward Shaw Cole, Montclair, N. J., and Leslie J. Hooper, Holden, Mass., assignors to Pitometer Log Corporation, a corporation of New York Application March 3, 1936, Serial No. 66,892

5 Claims. (Cl. 73—212)

The object of this invention was to produce a Pitot tube which, when introduced into currents of moving liquids or introduced into water from a vessel moving or traveling therein, will indicate accurately the rate of movement either of the liquid or the speed of the vessel.

Pitot tubes heretofore used in the art have been so designed that the readings of the manometer connected with the dynamic pressure tube and with the static pressure tube have not indicated accurately the axial component of angular flows of liquid in a pipe or the rate of motion of a ship in its true course when moving at small angles thereto.

It is known also that when Pitot tubes are introduced into moving liquids, such as water flowing in pipes or conduits, a change in the alignment of the Pitot tube with respect to the direction of flow in the pipe, changes the manometer readings created by the dynamic and static openings of the Pitot tube.

A Pitot tube, when placed in true alignment with the flow of water in a pipe or with the movement of a ship through relatively still water, produces a difference of pressure ($h$) from which the velocity ($v$) is derived according to the well known formula $$v = c\sqrt{2gh}$$

in which $c$ is the coefficient for the particular Pitot tube.

However, in tubes heretofore employed in hydraulic engineering, it has been found that certain Pitot tubes will cause the manometer to over-read, while other Pitot tubes will cause it to under-read the true cosine values, by one or more percent when rotated through angles of five or six degrees. These incorrect readings of the desired values have been detrimental when attempting to ascertain accurately the rate of flow of water through conduits or the speed of moving bodies, such as marine vessels, through the water.

It is the further object of this invention to form a Pitot tube in such a way that it will read the cosine of any small angles by which its alignment may differ from the flow of water in a pipe or from the true course of a ship, it being understood that the Pitot tube is normally aligned with the axis of the pipe or with the center line of the ship in the respective instances.

A fundamental requirement of such a tube is also so to design the component parts of the device that the factor or instrument coefficient that must be used to determine the actual speeds, shall be the same for a wide range of movement or speeds.

These results have been accomplished in a highly satisfactory manner by means of the arrangement described in the following specification and shown in the accompanying drawing forming a part thereof, in which:

Fig. 1 is an elevational view partly in section showing an early form of Pitot tube introduced into a conduit for measuring the rate of flow of the liquid therein;

Fig. 2 is a side elevation of an improved construction of a pitometer rod made according to the present invention;

Fig. 3 is an end elevation of the Pitot rod taken at substantially right angles to that of Fig. 2;

Fig. 4 is a transverse sectional view thereof taken substantially on the line 4—4 of Fig. 2;

Fig. 5 is a transverse sectional view thereof taken substantially on the line 5—5 of Fig. 2, and Fig. 6 is a graph showing the close degree of accuracy with which the Pitot tube coefficients follow the true cosines of the angles up to 6° between the movements of the liquid and the alignment of the Pitot tube.

Referring to the drawing, the numeral 1 indicates a conduit or pipe through which a liquid, such as water, is conveyed. The numeral 2 indicates a connection through which the Pitot tube device comprising the dynamic or pressure tube 3 and the static tube 4 may pass into said conduit 1. The upper ends of the tubes 3 and 4 are bent as shown at 5 and 6, and the ends thereof connect with a transparent U-shaped tube 7 within which a liquid of different density or higher specific gravity than the liquid being investigated may be placed. The flow of water, indicated by the arrows, within the conduit 1 produces a liquid pressure within the pipes 3 and 5 so that the indicating liquid within the U-shaped tube 7 is depressed on one side and raised on the other as indicated, thereby showing the difference of pressures within the tubes 3 and 4. The latter constitutes a manometer and in practical work has been made in various forms. The tube 4 represents a piezometer with the plane of its opening flush with the wall of the pipe or parallel with the direction of a ship's movement through the water. Thus, the static pressure of the liquid is effective in the tube 4. However, any static pressure operating within the tube 4 is counterbalanced by the same static pressure acting in the tube 3 and, therefore, the dynamic or velocity head due to the flow of the liquid through the conduit is indicated in the U-shaped tube or manometer 7.

As is well known in the art, the tubes 3, 4, 5, 6, and 7 are completely filled with non-compressible liquids, mercury and the water such as in the pipe 1.

The above description is inserted simply to indicate the underlying principles on which applicants' improvements are based and similar devices have been used for many years as constituting apparatus which would inaccurately indicate the rates of the flow of water within pipes or conduits such as that indicated by the numeral 1.

The essential parts of the Pitot tubes which effect their accuracy of measurement when connected with a manometer are the sizes and positions of the respective passages or tubes and of the opening or openings leading into the static passage or tube in a rod of the shape above referred to and illustrated in the drawing. Much research has been devoted thereto by the present applicants and in consequence thereof we have determined a construction of pitometer rod that will permit the Pitot tubes to produce readings that are very accurate, not only when they are situated parallel with the line of relative movement of the liquid, but when turned at angles of several degrees therefrom, will produce indications that are substantially true functions or the cosines of deflections of several degrees relative to the normal alignment of the Pitot tube.

Referring now to Fig. 2 of the drawing, the numeral 8 represents a rod of suitable material, preferably of phosphor-bronze. The main portion of this rod is preferably of the shape indicated by the cross section in Fig. 4, and the lower portion thereof is reduced at 9 so as to have the thin flattened cross section as indicated at 10 in Fig. 5. This type of rod has been described and claimed in United States Patent No. 1,810,907, issued June 23, 1931, to Edward S. Cole. However, the present rod is provided with converging surfaces forming approximately a V-shaped trailing edge as at 10'. The tube, indicated by 13 and 15, is the dynamic passage and is located in the groove 11.

The tube 14 is located in the groove 12 which has a reduced portion formed by a hole 16, that is approximately one third of the length of the horizontal lower surface of said end in advance of said trailing edge and the outer end of which is closed by a screw-threaded plug 17. The hole 16 is connected with two somewhat smaller lateral holes or openings extending at right angles thereto, as indicated by the numerals 18 and 19. These holes should have a diameter that is a fraction of the diameter of the hole 16 and should not be more than ¾ of that diameter. They are staggered with relation to their respective positions, as indicated in the lower portions of Figs. 2 and 3.

The sizes and relative positions of these two holes or openings 18 and 19 extending from the hole 16 in opposite directions are particularly important features of this invention. We have found that where the reduced portion of the Pitot rod is ⅜ of an inch in thickness, the central hole should have a diameter of $\frac{1}{16}$ of an inch and the holes 18 and 19 should be $\frac{3}{32}$ of an inch in diameter. The axial lengths of the holes 18 and 19 under that construction are about $\frac{3}{32}$ of an inch each but their lengths may be greater than their diameters, if preferred.

The axes of the holes 18 and 19, under above conditions, are preferably ¼ of an inch apart.

It has been found that should the holes 18 and 19 be located directly opposite each other, when of the same diameter, their action is quite different than when staggered as indicated in the drawing. The reason for this difference in action cannot at this time be explained except that by staggering the holes a direct flow of liquid through them is interrupted and the liquid is caused to follow a tortuous path. That effect can, obviously, also be brought about in other ways. Notwithstanding some more definite theory which might be settled upon as the basis for the improved action, it has been found that the accuracy with which Pitot tubes having a static passage with lateral holes arranged as above described produce effects that are much improved when used in recording or in indicating the rate of movement of a liquid, over what has heretofore been found to be possible.

A Pitot rod or device provided with dynamic and static passages having openings into the liquid as above described increases the value of the use of such devices, not only in determining the flow of liquid through a conduit, but also in determining the rate of travel of a steamer, boat or other vessel through the water.

In Fig. 6, the graph therein shown indicates the degree of accuracy with which the Pitot tube herein set forth will read the axial component of angular flow in a pipe or the progress of a ship in its true course, when the Pitot rod is turned to lie at small angles relative to the movement of the water or other liquid. The dotted line shows the exact cosine curve, while the full line shows the slight amount that the manometer readings vary from the true cosine curve in case the movement of liquid should be at slight angles to the actual alignment of the Pitot tube. That very desirable result has been attained not only because of the close approximation of the curve of actual readings to the true cosine curve but because the coefficients or factors to be used are the same for a wide range of rates of flow.

It is possible that the manometer readings may be caused by us to follow the true cosine curve over greater angles differing from the exact alignment by greater amounts than indicated above and it is expected that such results will be brought about by appropriate variations in the proportions and arrangements of the static tubes and the openings extending therefrom.

It will be appreciated that we have accomplished our desire to design the operative end of the pitometer rod or tubes so that certain changes in angles relative to the direction of the flow of the water will produce indications that correspond accurately with the cosines of such angles.

Having thus described this form of our invention which is at present deemed preferable, what we desire to protect by Letters Patent is:

1. In a Pitot tube instrument having a dynamic passage and a static passage, the improvements that comprise a static passage having opposed lateral openings through the wall thereof, said openings constituting with said passage, an angularly interrupted transverse conduit for allowing the fluid in which the tube is immersed to flow into and out of said static passage whereby the readings on said instrument will indicate substantially the true cosine function of the angles of axial turning of the instrument relative to the direction of flow or to the relative movement of said fluid.

2. In a Pitot tube instrument having a dynamic passage and a static passage, the improvements which comprise, a static passage having lateral openings in the wall thereof that extend in opposite directions from said passage, said openings being out of axial alignment and of such diameters relative to said passage as to produce a retarded flow of the liquid through said openings when the surfaces at the ends of the same are located at angles relative to the direction of flow or to the movement of the liquid in which the Pitot tube is immersed.

3. In a Pitot tube instrument having a dynamic passage and a static passage, the improvements which comprise, a static passage having lateral openings in the wall thereof that extend at right angles to said passage in opposite directions, said openings being staggered with relation to each other longitudinally of the instrument to cause the liquid to follow a tortuous path therethrough when the surfaces at the outer ends of the same are located at angles relative to the direction of flow or to the movement of the liquid in which the Pitot tube is immersed.

4. In a Pitot tube instrument having a dynamic passage and a static passage, the improvements which comprise, a static passage having lateral openings in the wall thereof that are of less diameter than said static passage and extend at right angles to said passage in opposite directions, said openings being staggered with relation to each other to cause the liquid to flow in a tortuous path therethrough when the planes of said openings are located at acute angles relative to the direction of flow or to the movement of the liquid in which the Pitot tube is immersed.

5. In a Pitot tube instrument, the improvements that comprise, a thin end having a vertical, reduced trailing edge and having a vertical static passage therein that is located between the forward and trailing edges of said end at approximately one third of the horizontal length of said end in advance of said trailing edge, said end having lateral openings connecting with said static passage and placed at unequal distances from the extremity of said end, whereby the liquid in which the instrument is immersed is caused to follow a tortuous path that is mainly transverse to said end when said instrument is turned at acute angles from true alignment with the direction of movement of the surrounding liquid.

EDWARD S. COLE.
E. SHAW COLE.
LESLIE J. HOOPER.